US009152857B2

(12) United States Patent
Choi et al.

(10) Patent No.: US 9,152,857 B2
(45) Date of Patent: Oct. 6, 2015

(54) SYSTEM AND METHOD FOR DETECTING OBJECT USING DEPTH INFORMATION

(71) Applicant: Soongsil University Research Consortium Techno-Park, Seoul (KR)

(72) Inventors: Hyung Il Choi, Seoul (KR); Sung Il Joo, Seoul (KR); Sun Hee Weon, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 0 days.

(21) Appl. No.: 14/326,812

(22) Filed: Jul. 9, 2014

(65) Prior Publication Data

US 2015/0016676 A1 Jan. 15, 2015

(30) Foreign Application Priority Data

Jul. 10, 2013 (KR) ........................ 10-2013-0081087

(51) Int. Cl.
*G06K 9/00* (2006.01)
*G06K 9/62* (2006.01)

(52) U.S. Cl.
CPC ........ *G06K 9/00389* (2013.01); *G06K 9/00201* (2013.01); *G06K 9/6257* (2013.01)

(58) Field of Classification Search
None
See application file for complete search history.

(56) References Cited

U.S. PATENT DOCUMENTS

2012/0326995 A1* 12/2012 Zhang et al. ................. 345/173
2013/0113956 A1* 5/2013 Anderson et al. .......... 348/223.1

FOREIGN PATENT DOCUMENTS

| JP | 2009-251962 A | 10/2009 |
| KR | 10-2013-0043394 A | 4/2013 |
| KR | 10-2013-0050672 A | 5/2013 |
| KR | 10-1279561 B1 | 6/2013 |

* cited by examiner

*Primary Examiner* — Shefali Goradia
(74) *Attorney, Agent, or Firm* — Pearne & Gordon LLP (57) ABSTRACT

A system for detecting an object is provided. The system includes a depth image receiver that receives a depth image from a depth camera; a strong classifier that classifies an object region and a non-object region in the depth image based on a characteristic of an object; and an object detector that detects the classified object region, wherein the strong classifier comprises a plurality of weak classifiers which are cascade connected to each other and classifies the object region and the non-object region by passing the depth image through the weak classifiers, the characteristic of the object is extracted based on a center depth value of the depth image, and the plurality of weak classifiers are generated through a training process for classifying positive training images among a multiple number of positive training images and a multiple number of negative training images.

11 Claims, 9 Drawing Sheets

Positive Set

Negative Set

SYSTEM AND METHOD FOR DETECTING OBJECT USING DEPTH INFORMATION

CROSS-REFERENCE TO RELATED APPLICATION

This application claims the benefit of Korean Patent Application No. 10-2013-0081087 filed on Jul. 10, 2013, the entire disclosures of which are incorporated herein by reference.

TECHNICAL FIELD

The embodiments described herein pertain generally to a system and method for detecting an object by using depth information.

BACKGROUND

In recent, due to the rapid development and spread of smart devices, public interests in the interface technology for operation of smart devices are being rapidly increasing. In order o reflect the trend, concentrated research and investment in the intelligent user interface realm have been made in each industrial field.

While the intelligent user interface has been researched over significantly long time, technical demand for the intelligent user interface is further increasing with the recent growth of the market for smart devices.

Among the intelligent interface technologies, a gesture interface technology can best reflect convenience and intuitiveness of users. As the most representative example for the gesture interface technology, there is the Kinect sensor developed by the Microsoft Corporation. The Kinect sensor is a technology realizing a real-time interactive game by combining a RGB camera and an infrared ray camera sensor with each other to recognize gestures and motions of users. Thanks to supply of low-cost hardware of the Kinect sensor and provision of the published library, many applicable gesture recognition technologies could have been developed.

Meanwhile, the gesture recognition technology can be largely divided into a technology, which recognizes a static gesture such as a hand pose by detecting the hand, and a technology, which recognizes a dynamic gesture by using movement trajectory of a hand. However, for such a gesture recognition technology, a stage for segmenting and detecting a hand region from an image should be preceded. To this end, most researches are being conducted on a method using color image information, a method using depth image information, and a method mixing color and depth information.

Among those methods, the gesture recognition method using color image information has been variously researched since it can most easily handle information, which can be acquired from an image. The method using color image information is advantageous in that it can rapidly detect a hand, but has a serious drawback in that it is vulnerable to change in a lighting condition and environments.

In order to overcome the drawback, researches on combining color image information and depth image information with each other have been conducted, but this method is problematic in that since it depends on a color image in a pre-processing stage, it is highly sensitive to a lighting condition.

In addition, researches on using a depth image alone are being conducted, but problematic in that they require the precondition that a hand should be located in the foremost position from a camera, and distance information for separating an arm region and a hand from each other cannot be easily discriminated.

In this regard, Korean Patent Application Publication No. 2013-0043394 (Title of Invention: METHOD OF IMAGE PROCESSING FOR DETECTING OBJECT, DEVICE, METHOD FOR USER INTERFACE AND USER INTERFACE THEREOF) describes extracting an object only by using depth information of an image acquired from a stereo camera or others.

In addition, Korean Patent Application Publication No. 2013-0050672 (Title of Invention: Method of virtual touch using 3D camera and apparatus thereof) describes determining existence of touch by detecting a screen region separated from a peripheral region of a screen part, detecting a body part region when a figure of a touch performer is sensed on the screen region, and comparing a depth value of the screen region and a depth value of the body part region with respect to the 3-dimensional camera.

SUMMARY

In view of the foregoing, example embodiments provide an object detection system and method for classifying and detecting a region of an object in real time from an input depth image by using a cascade-based boosting classifier and a depth difference characteristic.

In accordance with an example embodiment, a system for detecting an object is provided. The system may includes a depth image receiver that receives a depth image from a depth camera; an object characteristic extractor that extracts based on a center depth value of the depth image, a strong classifier that classifies an object region and a non-object region in the depth image based on the characteristic of an object; and an object detector that detects the classified object region, wherein the strong classifier comprises a plurality of weak classifiers which are cascade connected to each other and classifies the object region and the non-object region by passing the depth image through the weak classifiers, and the plurality of the weak classifiers are generated through a training process for classifying positive training images among a multiple number of positive training images and a multiple number of negative training images.

In accordance with another example embodiment, a method for detecting an object in an object detection system using depth information is provided. the method may include receiving a depth image from a depth camera; extracting a characteristic of the object based on a center depth value of the depth image; classifying an object region and a non-object region in the received depth image based on the characteristic of the object by using a strong classifier; and detecting the classified object region, wherein the strong classifier comprises a plurality of weak classifiers which are cascade connected to each other and classifies the object region and the non-object region by passing the depth image through the weak classifiers, and the plurality of the weak classifiers are generated through a training process for classifying positive training images among a multiple number of positive training images and a multiple number of negative training images.

In accordance with the example embodiments, it is possible to rapidly detect an object region in real time from an input depth image. Furthermore, since highly accurate detection of an object is possible, natural gesture interaction with users can be accomplished.

In addition, an object can be detected and traced in real time without being affected by changes in indoor lighting and environments.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. In addition, the term "comprises or includes" and/or "comprising or including" used in the document means that one or more other components, steps, operations, and/or the existence or addition of elements are not excluded in addition to the described components, steps, operations and/or elements. Through the whole document, the term "step of" does not mean "step for."

Figure 1:
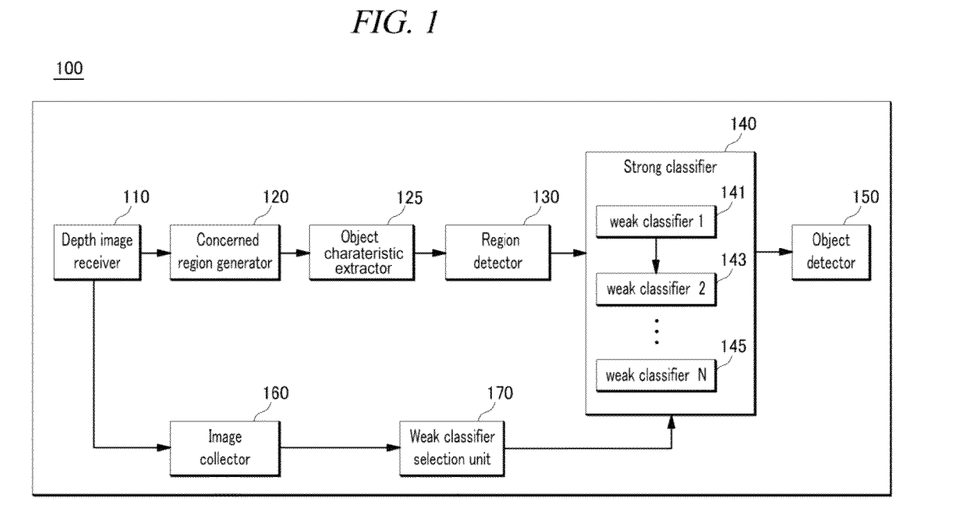
FIG. 1 illustrates a block diagram of an object detection system in accordance with an example embodiment.

FIG. 1 is a block diagram of an object detection system 100 in accordance with an example embodiment.

An object detection system 100 in accordance with an example embodiment includes a depth image receiver 110, a object characteristic extractor 125, a strong classifier 140, and an object detector 150.

For reference, the components illustrated in FIG. 1 in accordance with the example embodiment may imply software or hardware such as a field programmable gate array (FPGA) or an application specific integrated circuit (ASIC), and carry out predetermined functions.

However, the "components" are not limited to the software or the hardware, and each of the components may be stored in an addressable storage medium or may be configured to implement one or more processors.

Accordingly, the components may include, for example, software, object-oriented software, classes, tasks, processes, functions, attributes, procedures, sub-routines, segments of program codes, drivers, firmware, micro codes, circuits, data, database, data structures, tables, arrays, variables and the like.

The components and functions thereof can be combined with each other or can be divided.

The depth image receiver 110 receives a depth image from a depth camera. The received depth image may be used to detect an object. In addition, the depth image may be used in a process for training a strong classifier 140, which is described below.

The object characteristic extractor 125 extracts characteristic of the object based on a center depth value of the depth image.

The strong classifier 140 that classifies an object region and a non-object region in the depth image based of a characteristic of an object. The strong classifier 140 comprises a plurality of weak classifiers which are cascade connected to each other and classifies the object region and the non-object region by passing the depth image through the weak classifiers.

A weak classifier, which meets a detection rate equal to or higher than a threshold and the lowest false rate, may be added to the strong classifier 140. In this case, the weak classifier is generated through a process for classifying positive training images among a multiple number of positive training images and a multiple number of negative training images.

Hereinafter, the process for training the strong classifier 140 and the weak classifiers is described with reference to FIG. 2 to FIG. 6.

Figure 2:
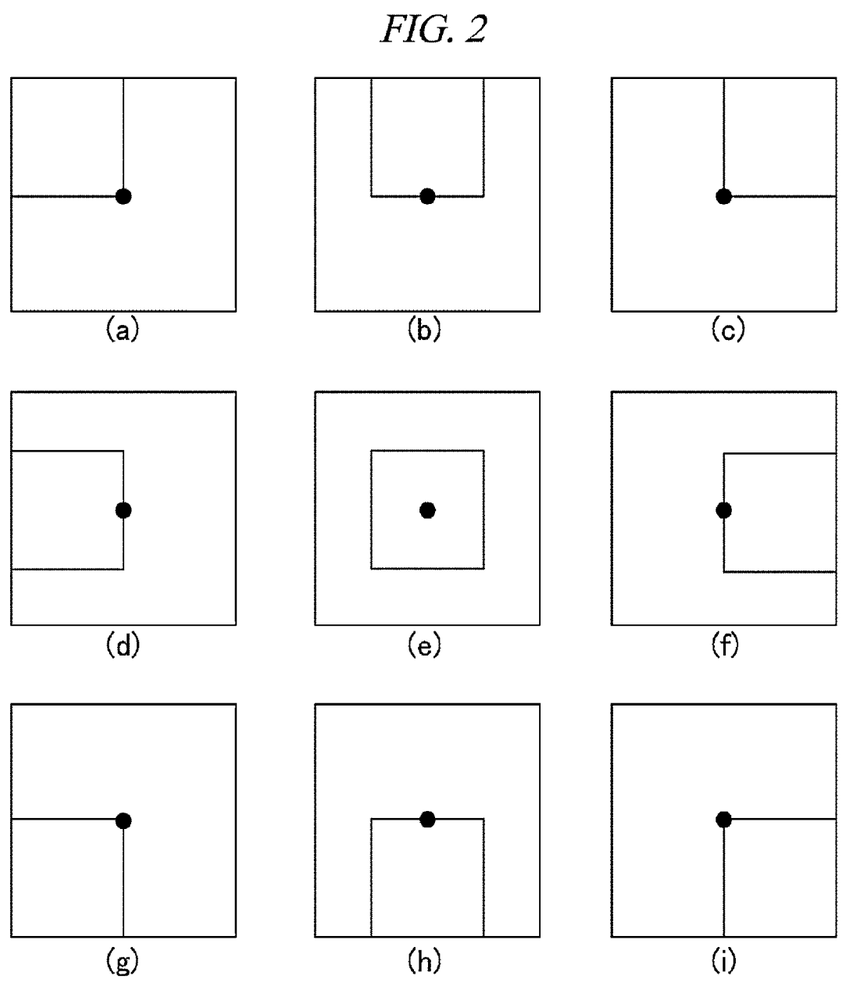
FIG. 2 shows an example for a method for extracting a characteristic of an object.

FIG. 2 illustrates an example for a method for extracting a characteristic of an object.

The object detection system 100 in accordance with the example embodiment extracts a simple characteristic of an object, and then, detects an object region by training weak classifiers, to which boosting and the cascade method are applied, by using the characteristic of the object. First, a difference between a center depth value and a depth value of peripheral pixels is obtained from the determined region by using a 2-dimensional linear model. In this case, characteristic may be extracted by segmenting the corresponding region into sub-blocks equal to Nx and Ny.

In FIG. 2, each of Nx and Ny is set to 2, and the center point means a center depth value. The square region means a region for calculation of a difference from the center depth value. Since each of Nx and Ny is set to 2, nine (9) characteristics can be extracted. If the weak classifier is trained as described above, the weak classifiers will use characteristic values of all cases of Nx={1, ..., n} and Ny={1, ..., m}.

Figure 3:
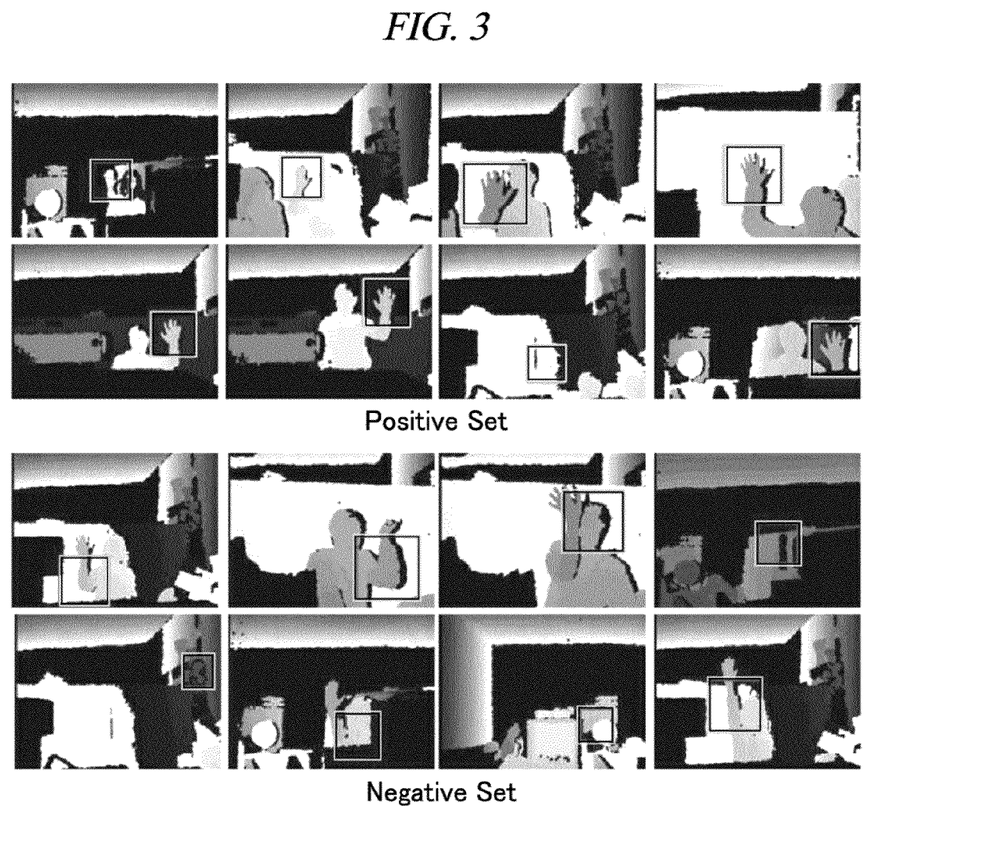
FIG. 3 shows collected positive training images and negative training images.

FIG. 3 illustrates the collected positive training images and negative training images.

In order to extract the characteristic of the object and train the cascade, training data are necessary. Such training images may be collected by an image collector 160. The image collector 160 may collect a multiple number of positive training images and a multiple number of negative training images from the depth image. In this case, the positive training images may be collected based on a distance between the depth camera and the object, and the negative training images may be randomly collected.

FIG. 3 illustrates the positive training images and the negative training images collected by the image collector 160. FIG. 3 shows an example where the object is set to a hand, and the size of the region for the characteristic extraction is dynamically determined and collected depending on a depth value of a hand region center.

Figure 4:
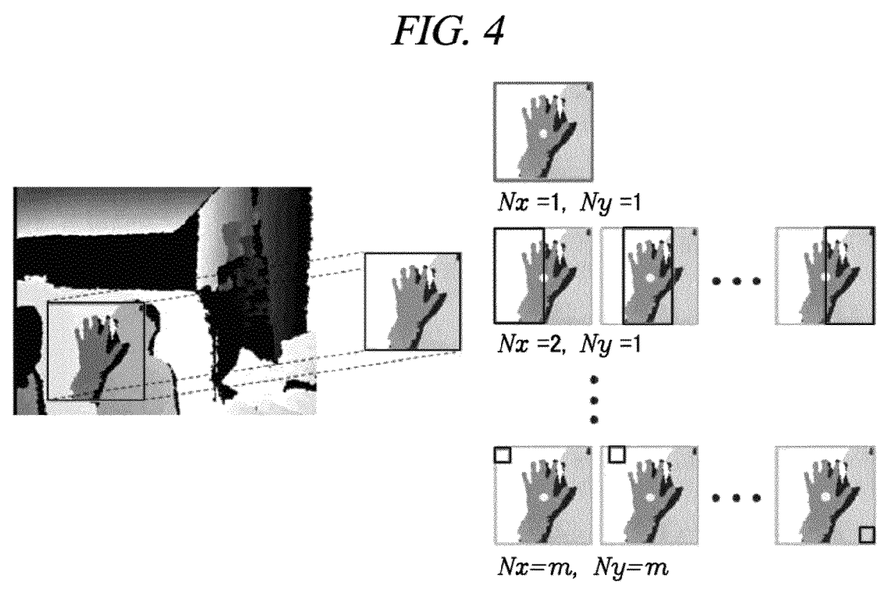
FIG. 4 illustrates a characteristic of an object extracted from a depth image.

FIG. 4 illustrates the characteristic of the object extracted from the depth image.

When training images and a region desired to be trained are given, a characteristic should be extracted from the region. The characteristic may be extracted by segmenting the region into sub-blocks as described with reference to FIG. 2. In this case, the characteristic extraction is implemented by segmenting the given region into sub-blocks to become from Nx=1, Ny=1 to Nx=n, Ny=m. FIG. 4 illustrates an example for the extracted characteristic, in which the characteristic is extracted by segmenting the hand region into smaller sub-blocks.

Figure 5:
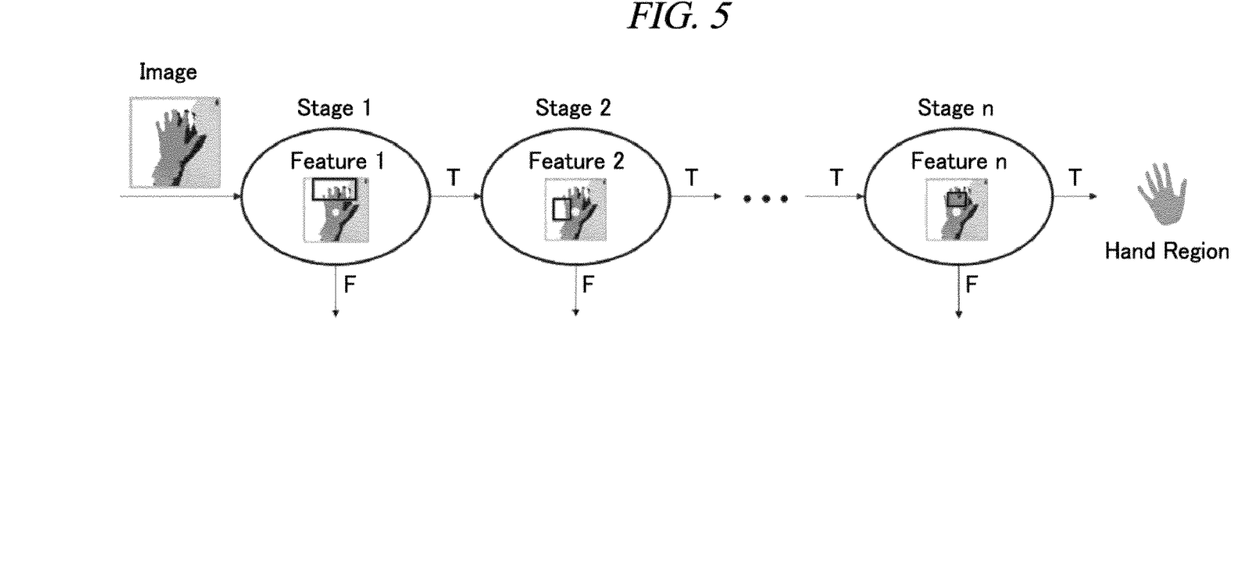
FIG. 5 illustrates a weak classifier connected by a cascade.
Figure 6:
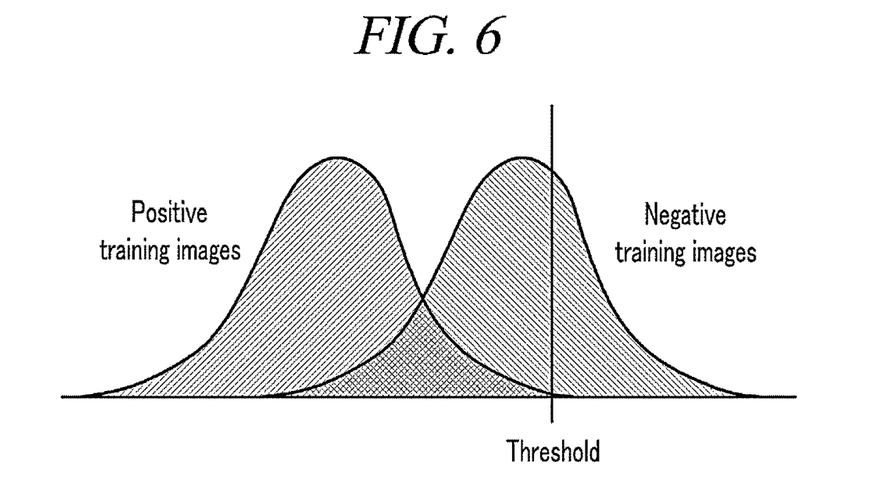
FIG. 6 illustrates a method for determining a threshold in a weak classifier.

FIG. 5 illustrates the weak classifiers connected by the cascade, and FIG. 6 illustrates a method for determining a threshold in the weak classifiers.

Once the positive training images and the negative training images, and the characteristic of the object are extracted, the training process may be implemented by using the Ada Boost. If the Ada Boost is used, a threshold having the lowest false rate for the training set is set when selecting a threshold of the characteristic.

However, unlike the Ada Boost method, the object detection system 100 in accordance with the example embodiment implements the training process by selecting weak classifiers meeting a detection rate, which is equal to or higher than a threshold, and the lowest false rate. This is intended to enable detection of an object even when the region desired to be detected has a simple pattern.

For this reason, the selected weak classifiers are connected to one another by the cascade method, and each stage is constructed with one weak classifier, so that a rapid calculation speed and a rapid detection speed can be expected, and simultaneously, the detection rate, which is equal to or higher than a threshold, can be maintained.

Meanwhile, the detection rate ($d_r$) and the false rate ($e_r$), which are applied to the weak classifiers, may be calculated according to [Math Formula 1] and [Math Formula 2] below.

$$d_r = \max((T^+ = S^+)/T^+, S^+/T^+) \quad \text{[Math Formula 1]}$$

$$e_r = \min(S^+ + (T^{31} + S^-), S^- + (T^+ - S^+)) \quad \text{[Math Formula 2]}$$

In this case, $S^+$ and $S^-$ mean sums of weighted values of the positive training images and the negative training images, which are equal to or less than a threshold, respectively. $T^+$ and $T^-$ mean a sum of whole weighted values of the positive training images and the negative training images. Based on the weighted values of the positive training image and the negative training image, the detection rate and the false rate of the weak classifiers may be calculated.

Meanwhile, each stage may be constructed with one weak classifier. In addition, a weak classifier to be included in the strong classifier 140 may be selected by a weak classifier selection unit 170. Hereinafter, the weak classifier selection unit 170 will be described.

Before the strong classifier 140 is generated, a multiple number of weak classifiers (for example, approximately 10 thousand weak classifiers) are generated. In order to select a weak classifier to be added to the strong classifier 140 from the multiple weak classifiers, a detection rate and a false rate for each of the weak classifiers should be calculated. In this case, the detection rate and the false rate may be calculated based on the weighted values as described above.

Once the detection rate and the false rate for the multiple weak classifiers are determined, the weak classifier selection unit 170 may select a weak classifier meeting the detection rate, which is equal to or higher than a threshold, and simultaneously meeting the lowest false rate from the multiple weak classifiers, and add the weak classifier to the strong classifier 140. In this case, the selected weak classifier includes all the positive training images, while meeting the lowest false rate as illustrated in FIG. 6.

Once the weak classifier is added to the strong classifier 140, an investigation process, which passes the positive training images and the negative training images through the strong classifier 140, is implemented. Through this investigation process, images recognized to be negative training images are removed, and the process for calculating weighted values based on the remaining training images and calculating a detection rate and a false rate of each of the weak classifiers is repeatedly implemented. This repetition is continuously implemented until the current false positive rate becomes smaller than the false positive rate set by the user, while comparing the false positive rate set by the user and the current false positive rate. The strong classifier 140 may be generated by adding the weak classifier selected as described above to the strong classifier 140.

FIG. 5 illustrates the strong classifier 140 applied to the example embodiment.

The object detection system 100 in accordance with the example embodiment may detect an object even when the object desired to be detected has a relatively simple pattern like a hand. Since the shape of the hand region is a front image of an unfold palm, most of the hand regions have a similar shape except for change depending on a size. Accordingly, for over-fitting of the classifiers, one weak classifier is allocated to every stage. Since the selected weak classifier meets the detection rate according to the threshold determination rule, it classifies the negative training images by passing most of the positive training images. Accordingly, the detection rate can be maintained even though the positive training images pass through the multi-stage weak classifiers.

Returning to FIG. 1, an object detector 150 detects the object region classified in the strong classifier 140. The object detector 150 is described with reference to FIG. 7 and FIG. 8 below.

Figure 7:
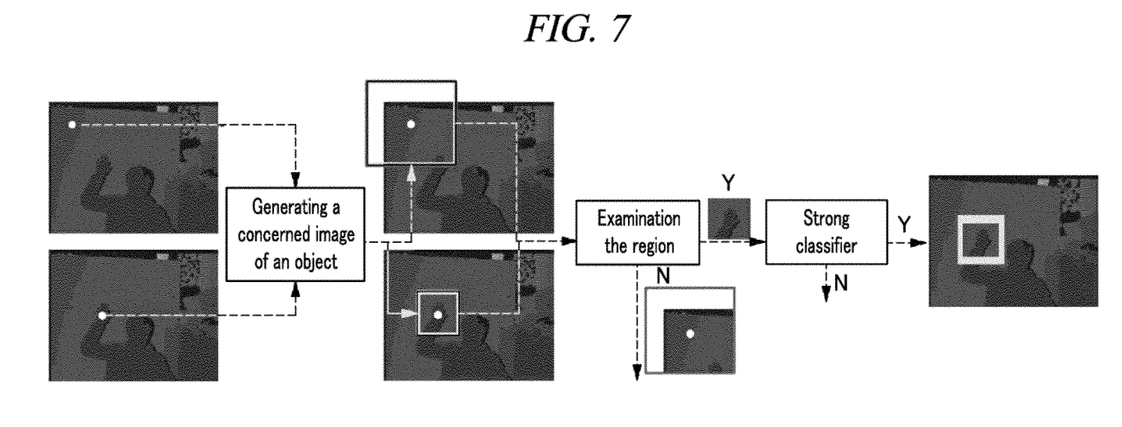
FIG. 7 illustrates a process for detecting an object in an object detection system.
Figure 8A:
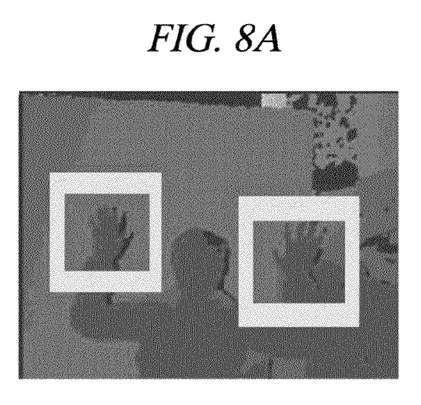
FIGS. 8a and 8b illustrates results of object detection.
Figure 8B:
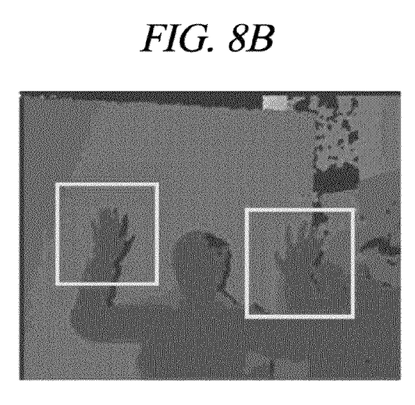

FIG. 7 illustrates an object detection process in the object detection system 100, and FIG. 8 illustrates results of the object detection.

When a certain region is given, the strong classifier 140 that has been generated through the training processing identifies whether the region corresponds to an object region desired to be detected. The hand region, which does not vary in size, should be detected by using the classifier, and a 2-dimensional linear model should be generated to meet the non-variation in size.

FIG. 7 shows a process for detecting an object region by using the 2-dimensional linear model and the classifiers connected by the cascade. First, a location desired to be classified is set, and then, a concerned region is generated.

In this case, the concerned region may be generated by a concerned region generator 120. The concerned region generator 120 may calculate a center value of the depth image, and generate a concerned region of the object based on the center value. In this case, the concerned region may be generated based on the 2-dimensional linear model.

Once the concerned region is generated, it may be examined whether the concerned region generated by a region examination unit 130 is included in the scope of the depth image. Pixels, which have passed the region examination, are sent to the classifiers, and classified into object regions if they pass all the generated classifiers.

(A) of FIG. 8a illustrates the state prior to combination of the classified object regions, and (B) of FIG. 8b illustrates the state after the combination. It is identified that prior to the combination of the object regions, many squares overlap with one another around the object regions. If such squares are one object, the squares may be combined to be one region, and thereby, detecting the object.

Meanwhile, the object detection system 100 in accordance with the example embodiment may further include a feedback unit (not illustrated). The feedback unit may deliver the object region detected by the object detector 150 to the strong classifier 140, and complement the training process for the object region detected in each of the weak classifiers within the strong classifier 140. Accordingly, the object region can be classified faster and more accurately when receiving a new depth image in the future.

Figure 9:
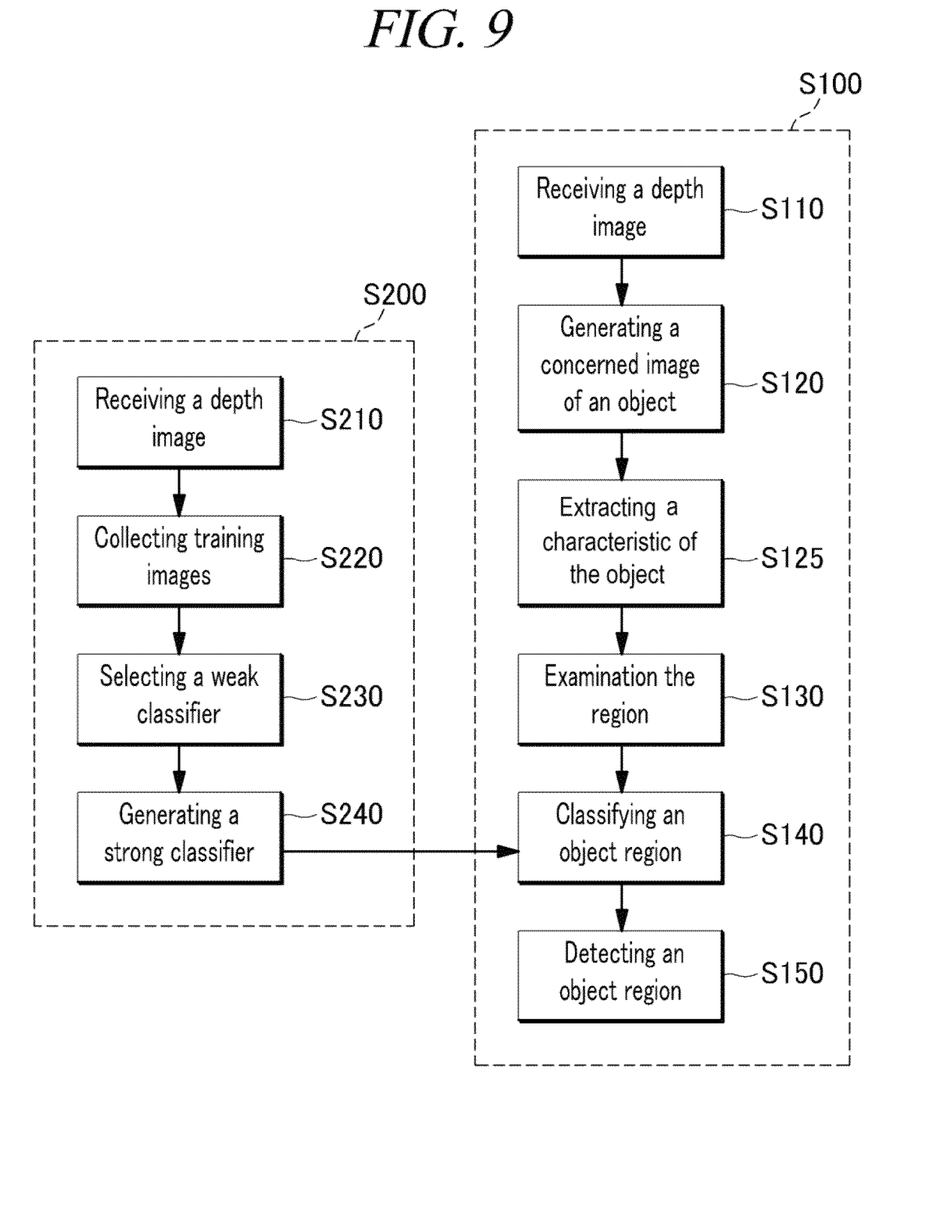
FIG. 9 is a flowchart of a method for detecting an object in accordance with an example embodiment.

FIG. 9 is a flowchart of a method for detecting an object in accordance with an example embodiment.

The object detection method in the object system using depth information first receives a depth image from a depth camera (S110). The received depth image may be used to detect an object. In addition, the depth image may be used in the process for training the strong classifier 140, which is described below.

Once the depth image is received, a center value of the depth image may be calculated, and on this basis, a concerned region of the object may be generated (S120). In addition, it is examined whether the generated concerned region is included in the scope of the depth image (S130).

Next, an object region and a non-object region are classified from the received depth image based of a characteristic of the object by using the strong classifier 140 (S140). The strong classifier 140 comprises a plurality of weak classifiers which are cascade connected to each other and classifies the object region and the non-object region by passing the depth image through the weak classifiers. In this case, the characteristic of the object is extracted based on the center value of the depth image (S125). The strong classifier 140 includes weak classifiers meeting the detection rate, which is equal to or higher than a threshold, and the lowest false rate. In this case, the weak classifiers are generated through the training process for classifying positive training images among a multiple number of positive training images and a multiple number of negative training images. Hereinafter, the training process of the weak classifiers is described hereinafter.

According to the process for training the weak classifiers, once a depth image is received (S210), a multiple number of positive training images and a multiple number of negative training images are collected (S220). In this case, the positive training images may be collected based on a distance between the depth camera and the object, and the negative training images may be randomly collected.

The weak classifiers are selected through the training process for classifying the positive training images among the collected positive training images and negative training images (S230). In this case, the weak classifiers connected by the cascade in the strong classifier 140 meet the detection rate, which is equal to or higher than a threshold, and the lowest false rate. In addition, the detection rate and the false rate may be calculated on weighted values of the positive training images and the negative training images.

Meanwhile, in order to select the weak classifiers to be added to the strong classifier 140, a multiple number of weak classifiers are generated, and detection rates and false rates for all the generated weak classifiers are calculated. In addition, the calculated false rates of the weak classifiers are arranged to select weak classifiers having the lowest false rate. Next, the selected weak classifiers are constructed in the cascade form, and the process is repeated until all the negative training images are classified, so that the strong classifier 140 can be generated (S240). By using the strong classifier 140 generated through the training process, an object region and a non-object region in the received depth image may be classified.

According to the object detection method, the object region classified by the strong classifier 140 is finally detected (S150). Since the stage for detecting the object region has been described with reference to FIG. 7 and FIG. 8, description thereof is omitted hereinafter.

Meanwhile, the object detection method in accordance with the example embodiment may further include a feedback stage based on the detected object region. That is, the feedback stage may be implemented by delivering the detected object region to the strong classifier 140, and implementing the training process for the object regions that have been detected in each of the weak classifiers within the strong classifier 140. Accordingly, an object region can be classified faster and more accurately when receiving a new depth image in the future.

The example embodiment can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The method and the system of the example embodiments have been described in relation to the certain examples. However, the components or parts or all the operations of the method and the system may be embodied using a computer system having universally used hardware architecture.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A system for detecting an object by using depth information, comprising:
    a depth image receiver that receives a depth image from a depth camera;
    an object characteristic extractor that extracts based on a center depth value of the depth image,
    a strong classifier that classifies an object region and a non-object region in the depth image based on the characteristic of an object; and
    an object detector that detects the classified object region,
    wherein the strong classifier comprises a plurality of weak classifiers which are cascade connected to each other and classifies the object region and the non-object region by passing the depth image through the weak classifiers, and
    the plurality of the weak classifiers are generated through a training process for classifying positive training images among a multiple number of positive training images and a multiple number of negative training images.

2. The system for detecting an object of claim 1, further comprising
    a concerned region generator that calculates the center depth value of the depth image, and on this basis, generates a concerned region of the object, and
    a region examination unit that examines whether the generated concerned region is included in the scope of the depth image.

3. The system for detecting an object of claim 2,
    wherein the concerned region generator generates the concerned region of the object based on a 2-dimensional linear model.

4. The system for detecting an object of claim 1, further comprising
    an image collector that collects the plurality of the positive training images and the plurality of the negative training images from the depth image.

5. The system for detecting an object of claim 4, further comprising
    a weak classifier selection unit that selects a weak classifier meeting a detection rate equal to or higher than a threshold, and the lowest false rate, and adds the weak classifier to the strong classifier,
    wherein the detection rate and the false rate are calculated based on weighted values of the positive training images and weighted values of the negative training images.

6. The system for detecting an object of claim 4,
    wherein the positive training images are collected based on a distance between the depth camera and the object, and the negative training images are randomly collected.

7. A method for detecting an object in an object detection system using depth information, comprising:
    receiving a depth image from a depth camera;
    extracting a characteristic of the object based on a center depth value of the depth image;
    classifying an object region and a non-object region in the received depth image based on the characteristic of the object by using a strong classifier; and
    detecting the classified object region,
    wherein the strong classifier comprises a plurality of weak classifiers which are cascade connected to each other and classifies the object region and the non-object region by passing the depth image through the weak classifiers, and
    the plurality of the weak classifiers are generated through a training process for classifying positive training images among a multiple number of positive training images and a multiple number of negative training images.

8. The method for detecting an object of claim 7, further comprising
    calculating the center depth value of the depth image, and on this basis, generating a concerned region of the object, and
    examining whether the generated concerned region is included in the scope of the depth image.

9. The method for detecting an object of claim 7, further comprising
    collecting the plurality of the positive training images and the plurality of the negative training images from the depth image.

10. The method for detecting an object of claim 9, further comprising
    selecting a weak classifier meeting a detection rate equal to or higher than a threshold, and the lowest false rate, and adding the weak classifier to the strong classifier,
    wherein the detection rate and the false rate are calculated based on weighted values of the positive training images and weighted values of the negative training images.

11. The method for detecting an object of claim 9,
    wherein the positive training images are collected based on a distance between the depth camera and the object, and the negative training images are randomly collected.

* * * * *

UNITED STATES PATENT AND TRADEMARK OFFICE
CERTIFICATE OF CORRECTION

PATENT NO. : 9,152,857 B2  
APPLICATION NO. : 14/326812  
DATED : October 6, 2015  
INVENTOR(S) : Hyung Il Choi et al.

Page 1 of 1

It is certified that error appears in the above-identified patent and that said Letters Patent is hereby corrected as shown below:

In the specification, column 5, line 48, please replace [Math Formula 2]

"$e_r = \min(S^+ + (T^{31} + S^-), S^- + (T^+ - S^+))$" with -- $e_r = \min(S^+ + (T^- + S^-), S^- + (T^+ - S^+))$ --

Signed and Sealed this  
Sixteenth Day of February, 2016

Michelle K. Lee  
*Director of the United States Patent and Trademark Office*